Patented Feb. 26, 1929.

1,703,158

UNITED STATES PATENT OFFICE.

JAMES M. McCLAVE, OF DENVER, COLORADO, ASSIGNOR TO THE CONSERVO COMPANY, OF DENVER, COLORADO, A CORPORATION OF COLORADO.

METHOD OF TREATING OILS FOR DISTILLATION.

No Drawing.   Application filed December 8, 1925. Serial No. 74,169.

This invention relates to the treatment of oils for the purpose of promoting the efficiency of distillation, and its principal object is to provide a simple, safe and economical method of treating the oils to obtain a higher percent of low boiling hydrocarbons by conversion of all or part of the high boiling hydrocarbons, and to promote the precipitation of asphalt, tar, free carbon and the like.

Another object of the invention is to avoid the deficiencies and impractical features of other methods heretofore devised for a similar purpose, principal among which are the method of treating oils with a metal and chlorine, usually combined as in aluminum chloride, and the method of releasing chlorine gas directly into the oils.

The first mentioned method is commercially of little value, not only by reason of the high cost of the reagents used and the economic necessity of recovering the metal from the sludge for reuse, but also because of its incapability of treating all oils and its deficiency in producing a sufficiently rapid and complete recovery of the low boiling products from the high boiling oils.

The second method above referred to is costly by reason of the apparently unavoidable loss and waste of material and the ever present menace to the health and lives of the operatives by reason of the highly poisonous nature of the chlorine gas.

The present invention consists briefly in treating the oils with an oxide of manganese preferably pyrolusite ($MnO_2$) and hydrochloric acid which cause a reaction acting directly on the hydrogen and carbon in the oil without any possible loss or waste, and which are cheap, easily handled and innoxious.

Other advantages of my process are that it may be effectually and advantageously employed in the treatment of refractory oils which do not readily respond to other methods, such as well oils containing sulfur and crude petroleums with a heavy asphalt base, shale oils, hydrocarbons from bituminous sands and waste oils from internal combustion engines.

The cheapness of my process, moreover, adapts it for use in small plants and in the reclamation of crank-case oils and other waste products, where more expensive methods would be economically prohibitive.

In order to obtain a uniform action it is preferred to first introduce the oxide of manganese which as previously stated is preferably pyrolusite into the oil in proportion to the amount of unsaturated compounds present after which the oil is agitated and the proper amount of hydrochloric acid added. This causes a chemical reaction in the ore which changes the free carbon from a colloidal to a flocculent condition and thereby causes a precipitation of the free carbon. The sludge which settles out of the liquid after the reagent mixture is spent, is removed as waste and it is a distinctive feature of the invention that the removal may be accomplished without refining.

The chemically treated oil is now ready for distillation and it is advantageous to add the same chemical reagents to the material at the time of distillation for the purpose of obtaining a greater percentage of low boiling oils and by further redistillation and chemical treatment practically all of the high boiling oils can be reduced to low boiling oils.

In practice the crude oil is treated in vessels provided with suitable means for agitation and after the chemicals have been introduced as stated hereinbefore, the mixture is agitated for at least one hour. The chemically treated oil is then allowed to stand for from twenty-four to forty-eight hours to precipitate the free carbon and other impurities and precipitation may be expedited by the application of heat. Upon removal of the precipitated sludge the oil is conveyed to the stills for fractional distillation at atmospheric pressure and new chemicals may be added at the time of distillation in case a larger amount of the low boiling oils is required. The amounts of oxide of manganese and hydrochloric acid required to produce the best results vary according to the character of the oil under treatment; as an illustration, an oil containing a low per-cent of unsaturates will require about one per-cent of manganese oxide and one per-cent of hydrochloric acid, while oils containing a higher per cent of unsaturates will require a proportionately larger amount of the reagents.

The process as described has been practically demonstrated to be of great value in preparing crude oils for distillation by the practically complete removal of carbon and other impurities and the conversion of substantially all the high boiling oils into low boiling oils, with the result of producing higher grades of finished products.

Oils having a high per cent of water can be treated advantageously by this method as the water is liberated without the oil foaming and is converted into steam below the normal boiling point.

Having thus described my invention, what I claim and desire to secure by Letters Patent is:

1. The process of treating oils consisting in introducing into an oil before and at the time of distillation, oxide of manganese and hydrochloric acid.

2. The process of treating oils consisting in introducing into an oil before and at the time of distillation, oxide of manganese and hydrochloric acid, in the presence of heat.

3. The process of treating oil consisting in introducing into the oil before distillation, oxide of manganese and hydrochloric acid, removing precipitate, and adding more of the same reagents at the time of distillation.

In testimony whereof, I have affixed my hand and signature.

JAMES M. McCLAVE.